United States Patent
Griswell, Jr. et al.

(10) Patent No.: US 7,516,279 B2
(45) Date of Patent: Apr. 7, 2009

(54) METHOD USING STREAM PREFETCHING HISTORY TO IMPROVE DATA PREFETCHING PERFORMANCE.

(75) Inventors: John Barry Griswell, Jr., Austin, TX (US); Francis Patrick O'Connell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/364,620

(22) Filed: Feb. 28, 2006

(65) Prior Publication Data

US 2007/0204108 A1 Aug. 30, 2007

(51) Int. Cl.
G06F 12/00 (2006.01)

(52) U.S. Cl. .................. 711/137; 711/205; 712/207
(58) Field of Classification Search .......... 711/137, 711/205; 712/207
See application file for complete search history.

(56) References Cited

U.S. PATENT DOCUMENTS

| | | | |
|---|---|---|---|
| 5,586,294 A | 12/1996 | Goodwin et al. | |
| 5,737,565 A | 4/1998 | Mayfield | |
| 5,761,706 A | 6/1998 | Kessler et al. | |
| 5,829,028 A | 10/1998 | Lynch et al. | |
| 5,941,981 A | 8/1999 | Tran | |
| 5,958,040 A | 9/1999 | Jouppi | |
| 6,499,116 B1 | 12/2002 | Roth et al. | |
| 6,535,962 B1 | 3/2003 | Mayfield et al. | |
| 6,574,712 B1 | 6/2003 | Kahle et al. | |
| 2006/0248281 A1* | 11/2006 | Al-Sukhni et al. | 711/137 |

OTHER PUBLICATIONS

Baer, Jean-Loup and Chen, Tien-Fu, An Effective On-Chip Preloading Scheme To Reduce Data Access Penalty, 1991, Conference on High Performance Networking and Computing, Proceedings of the 1991 ACM/IEEE conference on Supercomputing, ACM, pp. 176-186.*
Andrew S. Tanenbaum, Structured Computer Organization, 1984, Prentice-Hall, Inc., second edition, pp. 10-12.*
U.S. Appl. No. 11/154,160, filed Jun. 18, 2005, Felter et al.

* cited by examiner

Primary Examiner—Kevin L Ellis
Assistant Examiner—Jared I Rutz
(74) Attorney, Agent, or Firm—Yee & Associates, P.C.; Libby Z. Handelsman

(57) ABSTRACT

Computer implemented method, system and computer program product for prefetching data in a data processing system. A computer implemented method for prefetching data in a data processing system includes generating attribute information of prior data streams by associating attributes of each prior data stream with a storage access instruction which caused allocation of the data stream, and then recording the generated attribute information. The recorded attribute information is accessed, and a behavior of a new data stream is modified using the accessed recorded attribute information.

8 Claims, 4 Drawing Sheets

FIG. 4

| DIRECTION | LINE COUNT PER STREAM | CONCURRENT STREAM COUNT |
|---|---|---|

```
subroutine jacobi (n,m,dx,dy,alpha,omega,u,f,tol,maxit)
*******************************************
*error = 10.0 *tol
   k = 1
   do while (k.le.maxit .and. error.gt.tol)
      error = 0.0
   do j=1,m
      do i=1,n
         uold(i,j) =u(i,j)
      enddo
   enddo
   do j = 2,m-1
      do i=2,n-1
         resid = (ax*(uold(i-1,j) + uold(i+1,j))
     &          + ay*(uold(i,j-1) + uold(i,j+1))
     &          + b *uold(i,j)- f(i,j))/b
         u(i,j) = uold(i,j)- omega *resid
         error =error + resid*resid
      end do
   enddo
   k = k + 1
   error = sqrt(error)/dble(n*m)
enddo                    ! End iteration loop
   print*, 'Total Number of Iterations ', k
   print*, 'Residual            ',error
return
end
```

METHOD USING STREAM PREFETCHING HISTORY TO IMPROVE DATA PREFETCHING PERFORMANCE.

BACKGROUND OF THE INVENTION

1. Field of the Invention

The present invention relates generally to the data processing field, and more particularly, to a computer implemented method, system and computer program product for prefetching data in a data processing system.

2. Description of the Related Art

Hardware data prefetchers have been employed in modern data processing systems to anticipate and mitigate the substantial latency in retrieving data from lower level caches and other data storage media. This latency, which is the total number of processor cycles required to retrieve data from a data storage medium, has been growing rapidly as processor frequencies have increased without a corresponding improvement in the time required to access a data storage medium.

In response to this rapid growth in latency, stream hardware data prefetchers have been employed to detect data streams (any sequence of storage references that reference a contiguous set of cache blocks in a monotonically increasing or decreasing manner), and to begin prefetching data up to a predetermined depth, i.e. a predetermined number of cache blocks ahead of the data which the processing system is currently loading. The detection of a stream requires at least two cache misses to consecutive lines; and to avoid prefetching cache lines which may not be needed, prefetching for a newly detected stream generally begins conservatively and the depth of prefetching is gradually increased until a specified depth is achieved.

Modern stream prefetchers can track and prefetch multiple streams simultaneously by using a plurality of stream registers, where each stream register contains the address that identifies the state of the current data stream as well as other information such as the direction of the stream, the number of lines consumed since the start of the stream, and the generated but not yet scheduled prefetches.

Although the prefetch approach described above has worked effectively to date, the startup penalty (the two initial misses) and the ramp-up phase (where the prefetches may not be deep enough to ensure timely delivery of data to the application) have an associated performance penalty which grows as memory latency grows. Applications which tend to have short to medium stream lengths benefit only slightly from the data prefetcher, if at all, because of the startup penalty. For such situations, it is desirable to mitigate as much of the startup penalty as possible.

Data stream prefetchers hold some historical information about data streams that are currently defined in any of their stream registers as described earlier; i.e. the current data address, the direction, the next line to be prefetched and pending prefetches that have been generated but not sent. When a new stream displaces a current stream, however, this information is lost when these fields are overwritten with the new stream allocation.

Retaining some of this historical information (e.g. startup data address) to be used the next time the same data stream is detected in a subsequent iteration of the application code would help achieve the objective of lowering the startup penalty. For typical applications, however, this would require a huge table in order to be effective as there tends to be enormous numbers of data streams generated in the course of a typical application. For example, one double-nested or triple-nested loop structure alone can easily generate thousands of streams.

A solution to this problem is to allow the compiler to insert special instructions into the object code to direct the hardware prefetch engine to begin a stream at a specified address and to quickly ramp to the desired depth. This approach, however, requires applications to be recompiled and is limited to the imperfect knowledge that the compiler has at compilation time about the nature of the streams and their caching (since array sizes are often runtime variables).

It would, accordingly, be desirable to provide a mechanism for improving prefetching performance in a data processing system which is effective on existing binaries that have not been compiled using stream prefetch instructions in order to achieve better general exploitation of data prefetching hardware in the data processing system.

SUMMARY OF THE INVENTION

The present invention provides a computer implemented method, system and computer program product for prefetching data in a data processing system. A computer implemented method for prefetching data in a data processing system includes generating attribute information of prior data streams by associating attributes of each prior data stream with a storage access instruction which caused allocation of the data stream, and then recording the generated attribute information. The recorded attribute information is accessed, and a behavior of a new data stream is modified using the accessed recorded attribute information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram that schematically illustrates information stored at each index in the data stream history table in FIG. 3 according to an exemplary embodiment of the present invention;

FIG. 5 illustrates a common implementation of a Jacobi solver on a two-dimensional grid to assist in explaining aspects of the present invention.

DETAILED DESCRIPTION OF THE PREFERRED EMBODIMENT

Figures 1, 2:
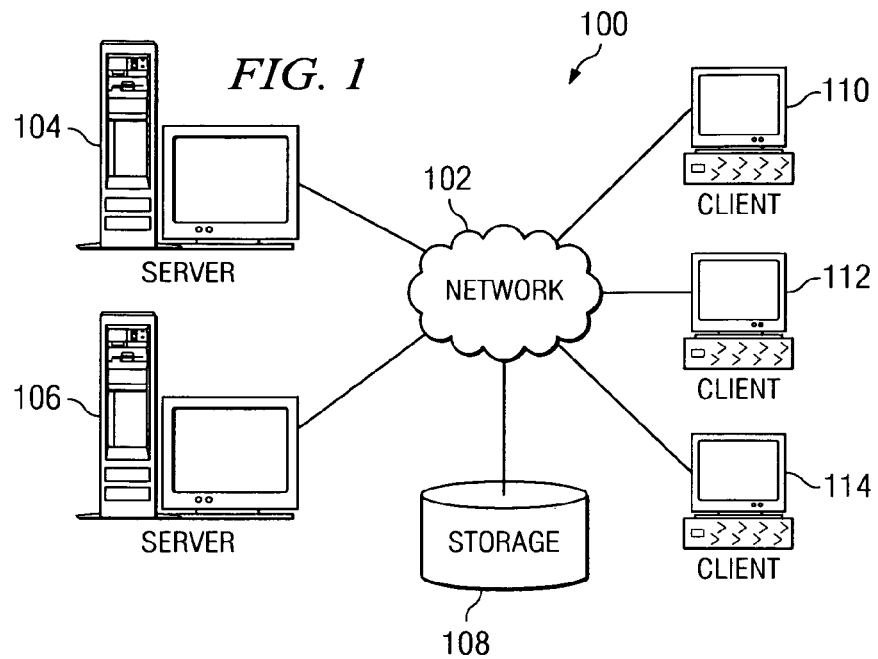
FIG. 1 depicts a pictorial representation of a network of data processing systems in which aspects of the present invention may be implemented.
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, system and computer program product for prefetching data in a data processing system. In accordance with the invention, concise historical information of data streams is retained in a data stream history table (DSHT), and used to greatly increase the effectiveness of a data stream prefetcher in a general data processing setting. More specifically, the invention records specific attributes of data streams generated by one or more instructions in a data stream history table. Information in the table is indexed by the address, or more generally by a hash of the address, of the storage access instruction which caused the stream to be allocated. The response of the stream prefetcher is improved by accessing and using the information in the DSHT each time it instantiates a new data stream.

The information in the DSHT modifies the startup and steady state behavior of new streams by indicating the likely direction and length of the streams as well as the likely number of temporal streams for the current instruction block. This latter piece of information may then be used to adjust the depth of prefetching for each stream, thereby maximizing performance while minimizing the prefetching of lines that are not likely to be consumed (needed). The data stream prefetcher then updates the DSHT with the most recent information as the stream is consumed by the program. The present invention thus provides an adaptive capability to a data stream prefetcher that enhances performance for applications which have not been recompiled to include software data prefetch control instructions. It also provides a powerful capability that compilers and application coders can exploit to optimize the performance of applications, in addition to existing software hints that direct the prefetcher.

Figure 3:
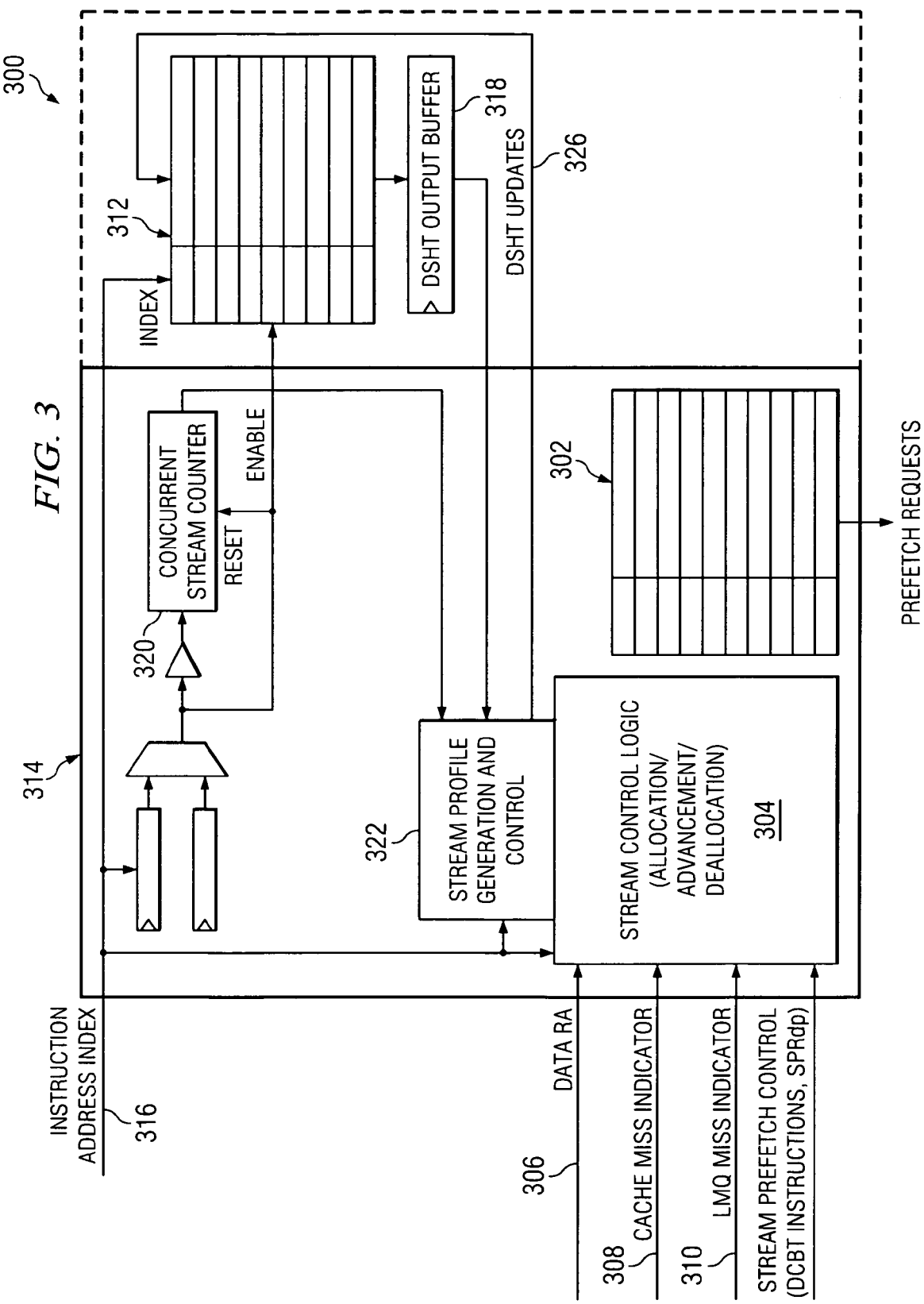
FIG. 3 is a block diagram that schematically illustrates a data stream prefetcher according to an exemplary embodiment of the present invention.

FIG. 3 is a block diagram that schematically illustrates a data stream prefetcher according to an exemplary embodiment of the present invention. The prefetcher is generally designated by reference number 300, and comprises a stream prefetcher with depth control, for example, as described in copending, commonly assigned U.S. patent application Ser. Nos. 11/054,889 and 11/054,871, both filed on Feb. 10, 2005, the disclosures of which are incorporated herein by reference.

The stream prefetch hardware is represented in FIG. 3 by stream registers and prefetch table 302, and stream control logic block 304, and acquires and prefetches data streams based upon the data operand load address 306 and associated cache miss information 308 and load miss queue (LMQ) information 310 pertaining to the cache line of the data operand.

According to the present invention, data stream history table (DSHT) 312 and associated control logic, generally designated by reference number 314, is included in prefetcher 300. DSHT 312 saves concise characteristics of the stream or streams corresponding to an instruction range, and is indexed by a hash of the address of that instruction range as shown at 316.

In an exemplary embodiment of the present invention, the hash consists of instruction address bits 42 through 55. In this case, all load instructions within a 256B instruction block (e.g. 32 four byte instructions) would be represented by one entry in DSHT 312, and the table would uniquely cover a program that was up to 4 MB in size with 16,384 entries. Note that larger programs will not have a unique mapping into the table, but even in the rare event that an alias occurs, there is no functional side-effect to the program; the only consequence concerns the performance of the application. In this way, it is similar to a branch history table. A table with a smaller number of entries (e.g. 4096 entries) would still provide positive results for a large number of workloads, and thus the size of the table can be traded off against the average performance improvement.

FIG. 4 is a diagram that schematically illustrates information stored at each index in DSHT 312 according to an exemplary embodiment of the present invention. The index is generally designated by reference number 400, and includes stream direction field 402, saturating line count per stream field 404 and saturating concurrent stream count field 406. The width of the later two fields will depend upon implementation details, but may typically be at least 4 bits and 3 bits wide, respectively.

When stream prefetch allocation logic 304 determines that a new stream entry should be installed in stream register 302, in addition to its normal action, the instruction address hash 316 is used to index into DSHT 312 to access information that modifies the manner in which the stream is prefetched as described below. DSHT accesses are saved in DSHT output buffer 318 until there is a table access to a different instruction block. If multiple streams are started within the same instruction block before another instruction block is encountered, as is typically the case for loop structures, the number of streams in this block is counted using concurrent stream logic 320. In this situation, DSHT output buffer 318 protects the prior information corresponding to this instruction range from any updates by recently created streams. As the application progresses and the streams are consumed, DSHT 312 is updated with the current stream length (in cache lines), direction and the concurrent stream count as indicated at 326.

Identifying streams according to a block of code which contains the load instruction that starts the stream is quite effective since most streams manifest themselves in looping structures (for, while, or do structures in the code for the application). For many applications, a relatively small set of loops produces the vast majority of instances of streams in the execution of the application; and even though the starting data address and certain characteristics of the streams may change each time an application executes a nest of loops, it is often the case that key characteristics of the streams in the loops are similar from the last execution. In other words, the best predictor of a stream's direction, length, and consumption rate is the most recent past. Therefore, if key characteristics such as stream direction, length, and the number of concurrent streams (which influences consumption rate) are saved, they may be used speculatively for the next invocation of the loop with great effectiveness.

To illustrate this, reference is made to FIG. 5 which illustrates a common implementation of a Jacobi solver on a two-dimensional grid to assist in explaining aspects of the present invention. Although the code shown in FIG. 5 is a small fraction of the code for the entire application, most of the computational time will be spent in this routine.

In particular, there are two key sets of nested loops within the do while loop; the first nested do j=1,m and do i=1,n simply copies the array from array u to array uold. The second, and more computationally complex loop, implements a Jacobi iteration on the grid using the old solution in array uold and the values in the array f. Note that each iteration of the inner i-loop has data streams that begin at different locations in the array, but which have the same direction (ascending) and length (n). Also, the first loop set has, at most, one stream while the second loop set has multiple streams associated with arrays f and uold.

For the first loop, based upon the concurrent stream count of one in the DSHT, the stream allocation logic will prefetch deeper (i.e. prefetch more lines ahead of the line currently being loaded) in order to avoid stalls due to memory latency. The exact number of streams in the second loop will be a function of the array sizes and the cache sizes of the machines, but for a given instance of the program, the number of concurrent streams will remain the same for a vast majority of the times the code is entered. If, for example, the machine caches are not large enough to contain the data in four columns of the arrays (uold(:,j−1), uold(:,j), uold(:,j+1), f(:,j), where the colon represents i for 1 to n), then there will be four streams active in each iteration of the inner loop i. In this case, the stream allocation logic would prefetch each stream less deep such that the prefetches from all four streams combined would match the latency to memory. Without this information, the hardware would use the same depth of prefetching for all streams, which would either contribute to the number unproductive prefetch requests or compromise performance. Note that for an application that frequently encounters series loads that span only several cache lines, the DSHT will adjust the prefetching profile applied to these nascent streams to minimal or none.

Figure 6:
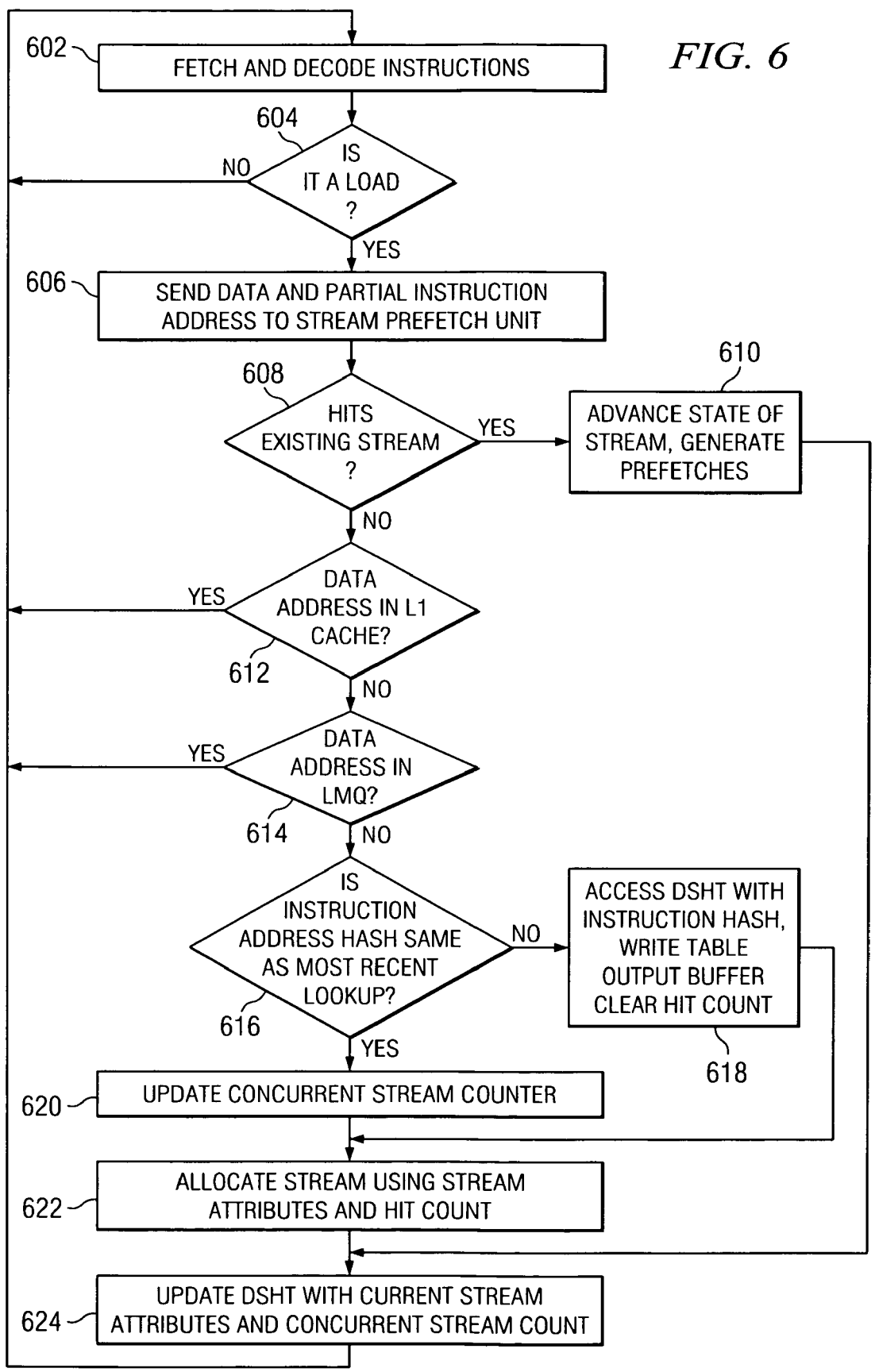
FIG. 6 is a flowchart that illustrates a computer implemented method for prefetching data in a data processing system according to an exemplary embodiment of the present invention.

FIG. 6 is a flowchart that illustrates a computer implemented method for prefetching data in a data processing system according to an exemplary embodiment of the present invention. The method is generally designated by reference number 600, and describes the program execution process.

The method begins by fetching and decoding instructions (Step 602), and making a determination whether it is a load (Step 604). If it is not a load (No output of Step 604), the method returns to Step 602. If it is a load (Yes output of Step 604), a subset of the address bits of load instructions are sent to a stream prefetch unit along with the real data address (Step 606).

As part of the normal action of the stream prefetcher, the load data address is run against all current stream data addresses in each of the stream registers, and a determination is made whether there is a match (Step 608). If there is a match (Yes output of Step 608), the state of the stream is advanced and prefetches are generated (Step 610), and the DSHT is updated with current stream attributes and concurrent stream count information (Step 624).

In the event that there is no match (No output of Step 608), it is determined if the load address is further qualified with hit/miss information (Step 612), and, in the event of a miss (No output of Step 612), compared against addresses currently in the load miss queue (LMQ) (Step 614). If the address corresponds to a line which is not part of a current stream and has not missed the L1 cache or the LMQ (Yes outputs of Steps 612 or 614, the method returns to Step 602. If the address corresponds to a line which is not part of a current stream and has missed the L1 data cache and the LMQ (No output of Step 614), a new stream is instantiated, and a check is made to see if the instruction address hash corresponding to the load instruction is the same as the one which preceded it (step 616). If not (No output of Step 616), the DSHT is accessed using the instruction address bits as an index to read out information of previous streams that have corresponded to this instruction block from earlier executions of these instructions, and the concurrent stream count is cleared (Step 618).

If the instruction hash does match the previous one (Yes output of Step 616), then the information desired is obtained from the buffer containing the last access to the DSHT and the field indicating the number of streams for this entry is incremented in the DSHT corresponding to this instruction block (Step 620). The information from the buffer is used to start, or perhaps to inhibit, the prefetching of the streams. After initiating a stream or updating an existing stream (Step 622), the DSHT is updated at the location of the instruction hash that corresponds to the initiating load instruction (Step 624), and the method returns to Step 602.

The present invention thus provides a computer implemented method, system and computer program product for prefetching data in a data processing system. A computer implemented method for prefetching data in a data processing system includes generating attribute information of prior data streams by associating attributes of each prior data stream with a storage access instruction which caused allocation of the data stream, and then recording the generated attribute information. The recorded attribute information is accessed, and a behavior of a new data stream is modified using the accessed recorded attribute information.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for prefetching data in a data processing system, comprising:

generating attribute information of prior data streams by associating attributes of each prior data stream with a data storage access instruction which caused allocation of the prior data streams, wherein generating the attribute information of the prior data streams by associating the attributes of the each prior data stream with the storage access instruction which caused allocation of the prior data stream comprises grouping data stream attributes of the prior data streams according to non-overlapping proximate instruction groups which contain the data storage access instructions which caused the allocation of the data streams;

recording the generated attribute information;

accessing the recorded attribute information; and modifying a behavior of a new data stream using the accessed recorded attribute information.

2. The computer implemented method according to claim 1, and further comprising:

summing the number of streams in each instruction group to find a concurrent number of the prior data streams for the each instruction group for indicating a likely number of temporal streams for an application at a state of execution.

3. The computer implemented method according to claim 2, wherein modifying the behavior of the new data stream using the accessed recorded attribute information comprises:

modifying startup and steady state behavior of the new data stream by indicating a likely direction and likely length of the new data stream.

4. The computer implemented method according to claim 1, wherein modifying the behavior of the new data stream using the accessed recorded attribute information, comprises:

adjusting a depth of prefetching for the new data stream based upon a likely length and likely number of temporal streams.

5. The computer implemented method according to claim 1, and further comprising:

updating the recorded attribute information with recent information as the new data stream is consumed.

6. The computer implemented method according to claim 1, wherein recording the generated attribute information comprises:

recording the generated attribute information of at least one prior data stream generated by an instruction group in a data stream history table.

7. The computer implemented method according to claim 6, further comprising:

indexing the recorded generated attribute information in the data stream history table by a hash of an address of the associated instruction group where the at least one prior data stream was first allocated, and wherein accessing the recorded attribute information comprises:

accessing the recorded attribute information using the index.

8. The computer implemented method according to claim 7, wherein the index comprises a stream direction field, a saturating line count per stream field, and a saturating concurrent stream count field.

* * * * *